Feb. 18, 1941.  C. L. ALKIRE  2,232,423

OIL FILTER

Filed Nov. 4, 1939

Inventor

*Cleatus L. Alkire.*

By *Clarence A. O'Brien
and Hyman Berman*
Attorneys

Patented Feb. 18, 1941

2,232,423

UNITED STATES PATENT OFFICE 2,232,423

OIL FILTER

Cleatus L. Alkire, Grand Island, Nebr., assignor of one-half to James L. Carter, Grand Island, Nebr.

Application November 4, 1939, Serial No. 302,917

1 Claim. (Cl. 210—131)

This invention relates to an oil filter, the general object of the invention being to provide means whereby the filtering medium can be easily removed and replaced by new filtering medium whenever desired or necessary so that it is not necessary to buy an entire new filter or cartridge.

This invention also consists in certain other features of construction and in the combination and arrangement of the several parts to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which.

Figure 1:
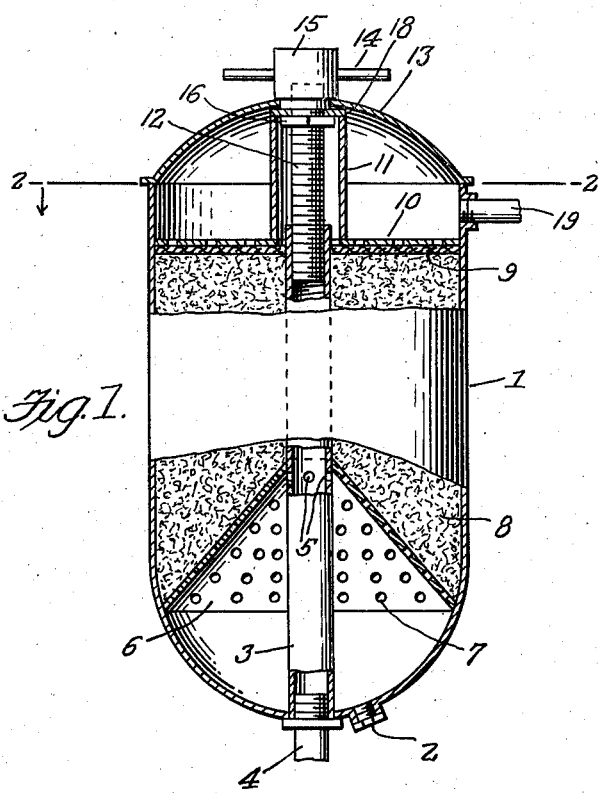
Figure 1 is an elevational view with parts in section of the improved filter.
Figure 2:
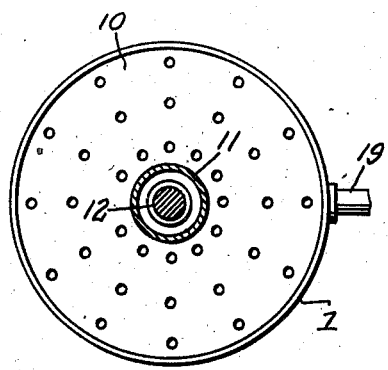
Figure 2 is a section on the line 2—2 of Figure 1.
Figure 3:
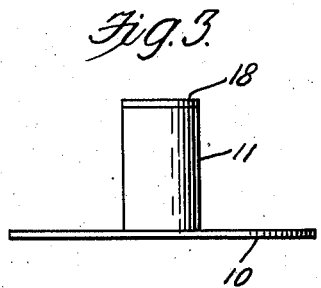
Figure 3 is a view of the member for holding the felt and filtering medium in place.

In these views the numeral 1 indicates a cylindrical container having a rounded bottom which is provided with a drain opening closed by a plug 2, a vertically arranged tube 3 extends upwardly from the bottom of the container to a point adjacent the upper end thereof and an inlet tube 4 is threaded into the lower end of the tube 3 and the intermediate part of this tube 3 is provided with the perforations 5 for the escape of the oil from the tube 3. A perforated conical shaped member 6 extends upwardly from the upper portion of the rounded bottom of the member 1 and has a hole in its apex through which the tube 3 passes The perforations in this conical member being shown at 7. This conical member 6 forms a support for the filtering material 8 which may be cotton waste or any other suitable material and a washer 9 of felt or the like resting on the top of this material 8. A perforated disk 10 is seated on the washer 9 and has a tubular member 11 extending upwardly from the central portion thereof, said central portion of the disk 10 being open for the passage of the upper end of the tube 3. The lower end of the tubular member 11 is suitably connected at its lower end with the central portion of the disk and the center opening in the disk is surrounded by this tubular member. A screw shaft 12 passes through a centrally arranged opening in a dome-shaped cover 13 for the upper end of the member 1 into the internally threaded upper end of the tube 3 so that by tightening this shaft by means of the handles 14 connected with the head 15 of the shaft the cover will be held tightly on the container 1. A nut 16 is threaded on the shaft 12 and holds the washer 18 fastened to the top of the tubular member 11 between itself and the reduced lower end of the head 15 as shown in Figure 1.

Thus it will be seen that by loosening the screw shaft 12 the cover 3 can be removed and the member 10 can also be removed after which the washer 9 is removed and the material 8 taken from the device. Then the container 1 and the member 6 with the tube are thoroughly cleaned after which a new material 8 is placed in the device upon the member 6, the washer 9 cleaned and put back in place or a new one substituted for the old one and then the member 10 is put back in place and the cover 3 placed on the container 1 and the screw tightened which will close the cover on the member 1 and cause the member 10 to press upon the washer 9 and the top of the material so as to compress the material 8 to provide the filtering medium.

The oil will pass from the tube 4 into the tube 3 and pass through the perforations 5 into the lower part of the container 1 and then the oil will pass through the perforations in the member 6, through the filtering material 8 and washer 9 and through the perforations in the member 10 into the chamber formed at the upper end of the container 1 and from this chamber the filtering oil will pass to the point of use through the tube 19.

From the foregoing it will be seen that when the filtering material becomes soiled and clogged it can be easily removed and replaced by new material so that the filter can be kept in good condition very easily and with but little expense.

It is thought from the foregoing description that the advantages and novel features of the invention will be readily apparent.

It is to be understood that changes may be made in the construction and in the combination and arrangement of the several parts provided that such changes fall within the scope of the appended claim.

Having described the invention, what is claimed as new is:

A filter member comprising a container having a closed bottom and an open top, a tube extending into the container from the bottom thereof with the upper end of the tube threaded, and spaced below the top of the container, an intermediate part of the tube having perforations therein, a removable conical member in the lower part of the container, said conical member being perforated and having an opening in its apex through which the tube passes with the perforations in the tube communicating with the space formed by said conical member, filtering material resting on the conical member and having its top portion located below the top of the tube, a perforated disk extending across the top of the filtering material, a tubular member connected with the central part of the disk and surrounding the upper end of the tube and said disk having a central opening therein through which the upper end of the tube passes, a cover for the container, a screw shaft rotatably passing through the center of the cover and having its lower end threaded to the upper end of the tube for holding the cover on the container and the top of the tubular member having a cover member formed with an opening through which a part of the screw shaft passes and a nut on the screw shaft for holding said cover member of the tubular member between itself and the upper end of the shaft and an outlet pipe connected with the top part of the container above the perforated disk.

CLEATUS L. ALKIRE.